United States Patent
Dong et al.

(10) Patent No.: US 12,430,855 B2
(45) Date of Patent: Sep. 30, 2025

(54) MIXED REALITY PROCESSING SYSTEM AND MIXED REALITY PROCESSING METHOD

(71) Applicant: HTC Corporation, Taoyuan (TW)

(72) Inventors: Shi-Hao Dong, Taoyuan (TW); Yi-Chen Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 328 days.

(21) Appl. No.: 17/881,783

(22) Filed: Aug. 5, 2022

(65) Prior Publication Data
US 2023/0267692 A1     Aug. 24, 2023

Related U.S. Application Data

(60) Provisional application No. 63/311,566, filed on Feb. 18, 2022.

(51) Int. Cl.
| | |
|---|---|
| *G06V 10/00* | (2022.01) |
| *G02B 27/01* | (2006.01) |
| *G06T 7/11* | (2017.01) |
| *G06T 7/70* | (2017.01) |
| *G06T 19/00* | (2011.01) |
| *G06V 40/10* | (2022.01) |

(52) U.S. Cl.
CPC ........ *G06T 19/006* (2013.01); *G02B 27/0172* (2013.01); *G06T 7/11* (2017.01); *G06T 7/70* (2017.01); *G06V 40/103* (2022.01); *G06T 2207/30196* (2013.01)

(58) Field of Classification Search
CPC ..................... G06T 19/006; G06T 7/70; G06T 2207/30196; G06T 2207/30244; G02B 27/0172
See application file for complete search history.

(56) References Cited

U.S. PATENT DOCUMENTS

| | | | | |
|---|---|---|---|---|
| 10,482,677 | B1* | 11/2019 | Iyer | ......................... G06F 17/16 |
| 2017/0116788 | A1* | 4/2017 | Chenglei | ................. A63F 13/25 |
| 2017/0259176 | A1 | 9/2017 | Kruglick | |
| 2018/0032031 | A1* | 2/2018 | Du | .......................... G06T 19/20 |
| 2019/0178654 | A1* | 6/2019 | Hare | ......................... G06T 7/70 |
| 2020/0363867 | A1* | 11/2020 | Azimi | ................ G02B 27/0179 |
| 2021/0295548 | A1* | 9/2021 | Veiga | ......................... G06T 7/73 |

FOREIGN PATENT DOCUMENTS

| | | | | |
|---|---|---|---|---|
| CN | 103460256 | A | | 12/2013 |
| CN | 105373224 | A * | 3/2016 | ............ A63F 13/211 |
| CN | 113181619 | A | | 7/2021 |
| CN | 113397526 | A * | 9/2021 | ............... G06T 7/60 |

OTHER PUBLICATIONS

Extended European Search Report for European Application No. 22191986.3, dated Jul. 20, 2023.

* cited by examiner

*Primary Examiner* — Vu Le
*Assistant Examiner* — Zaid Muhammad Saleh
(74) *Attorney, Agent, or Firm* — Birch, Stewart, Kolasch & Birch, LLP

(57) ABSTRACT

A mixed reality processing method includes the following steps. A virtual scene is displayed by a head-mounted display. The virtual world coordinates of a physical object are obtained using a first SLAM map. A tracker uses a second SLAM map to obtain the real world coordinates of the physical object. The virtual world coordinates and the real world coordinates are merged. The virtual scene and the physical object are combined by a processor to generate a mixed reality image.

10 Claims, 4 Drawing Sheets

MIXED REALITY PROCESSING SYSTEM AND MIXED REALITY PROCESSING METHOD

BACKGROUND OF THE INVENTION

Field of the Invention

The present disclosure relates to a processing system and, in particular, to a mixed reality processing system and a mixed reality processing method.

Description of the Related Art

Generally speaking, to create mixed reality images, it is necessary to apply a green screen removal method, because green screen removal is an imaging technique that can completely separate the user from the green screen background. Therefore, the user is able to experience virtual reality only within the range of the green screen, and the user can be completely separated from the green screen background through the method of keying out the green screen.

However, the segmentation of the two-dimensional (2D) image of the user may not be accurate enough. For example, a part of the green screen may be captured, or the user may not be completely captured. In addition, the conventional method needs to overlap a camera with built-in real-world coordinates and a controller with built-in virtual-world coordinates to align the real-world coordinates with the virtual-world coordinates. In this way, the scene (other than the user) can be replaced with the correct scene in the virtual reality. This method is relatively inconvenient, and merging the two coordinates may cause errors.

Therefore, how to make the system accurately and efficiently identify specific objects has become one of the problems to be solved in the field.

BRIEF SUMMARY OF THE INVENTION

In accordance with one feature of the present invention, the present disclosure provides a mixed reality processing system. The mixed reality processing system includes a camera, a head-mounted display (HMD), a tracker, and a processor. The camera captures a two-dimensional image including a physical object. The head-mounted display displays a virtual scene, and obtains virtual world coordinates of the physical object in the virtual world through a first simultaneous localization and mapping map (SLAM map). The virtual world coordinates are based on real world coordinates to generate the virtual scene. The tracker differentiates the physical object from the two-dimensional image, and obtains the real world coordinates of the physical object in the real world through a simultaneous localization and mapping map. The processor merges the virtual world coordinates and the real world coordinates, and merges the virtual scene and the physical object to generate a mixed reality image.

In one embodiment, the physical object is a human body, the tracker inputs the two-dimensional image into a segmentation model, and the segmentation model outputs a human body block, and the human body block is a part of the two-dimensional image.

In one embodiment, the tracker inputs the two-dimensional image into a skeleton model, and the skeleton model outputs a plurality of human skeleton points, the tracker generates a three-dimensional pose according to the human skeleton points, the three-dimensional pose is configured to adjust the capture range of the human body block.

In one embodiment, the processor is located in the tracker or in an external computer, and the processor is configured to generate merging coordinates after respectively coinciding the origins and coordinate axes of the virtual world coordinates and the real world coordinates; wherein the processor superimposes the human body block from the tracker on the virtual scene from the head-mounted display according to the merging coordinates to generate the mixed reality image.

In one embodiment, the tracker and the camera are located outside the head-mounted display, and outside-in tracking technology is applied to track the position of the head-mounted display.

In accordance with one feature of the present invention, the present disclosure provides a mixed reality processing method. The mixed reality processing method includes the following steps. A camera captures a two-dimensional image that includes a physical object. A virtual scene is displayed. A head-mounted display (HMD) obtains the virtual world coordinates of the physical object in the virtual world using a first simultaneous SLAM map. The virtual world coordinates used to generate the virtual scene are based on real world coordinates. A tracker differentiates the physical object from the two-dimensional image. The tracker obtains the real world coordinates of the physical object in the real world through a simultaneous localization and mapping map. A processor merges the virtual world coordinates and the real world coordinates. The processor merges the virtual scene and the physical object to generate a mixed reality image.

In one embodiment, the physical object is a human body and the mixed reality processing method further includes inputting the two-dimensional image into a segmentation model using the tracker. The segmentation model outputs a human body block. The human body block is a part of the two-dimensional image.

In one embodiment, the mixed reality processing method further includes using the tracker to input the two-dimensional image into a segmentation model. The segmentation model outputs a human body block, which is a part of the two-dimensional image.

In one embodiment, the mixed reality processing method further includes the tracker inputting the two-dimensional image into a skeleton model. The skeleton model outputs a plurality of human skeleton points. The tracker generates a three-dimensional pose according to the human skeleton points. The three-dimensional pose is configured to adjust the capture range of the human body block.

In an embodiment wherein the processor is located in the tracker or in an external computer, the mixed reality processing method further includes the following steps. The processor generates merging coordinates after coinciding the origins and coordinate axes of the virtual world coordinates with the respective real world coordinates. The processor superimposes the human body block from the tracker on the virtual scene from the head-mounted display according to the merging coordinates to generate the mixed reality image.

To sum up, the embodiments of the present invention provide a mixed reality processing system and a mixed reality processing method, in which a physical object image in a two-dimensional image is differentiated by a tracker. The simultaneous positioning in the tracker and the map construction map and the simultaneous positioning in the head-mounted display and the map construction map are overlapped by the processor to achieve the effect of coordinate calibration. The virtual scene and the physical object image are thereby merged to generate mixed reality imagery. The processor overlaps the simultaneous localization and mapping map in the tracker and the simultaneous localization and mapping map in the head-mounted display. This achieves the effect of coordinate calibration and combines the virtual scene with the real object image to generate a mixed reality image.

Therefore, the mixed reality processing system and the mixed reality processing method of the present invention can obtain an image of a physical object without using a green screen. There is also no need to align the camera with built-in real world coordinates and the handlebar with built-in virtual world coordinates for coordinate calibration.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "comprises" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
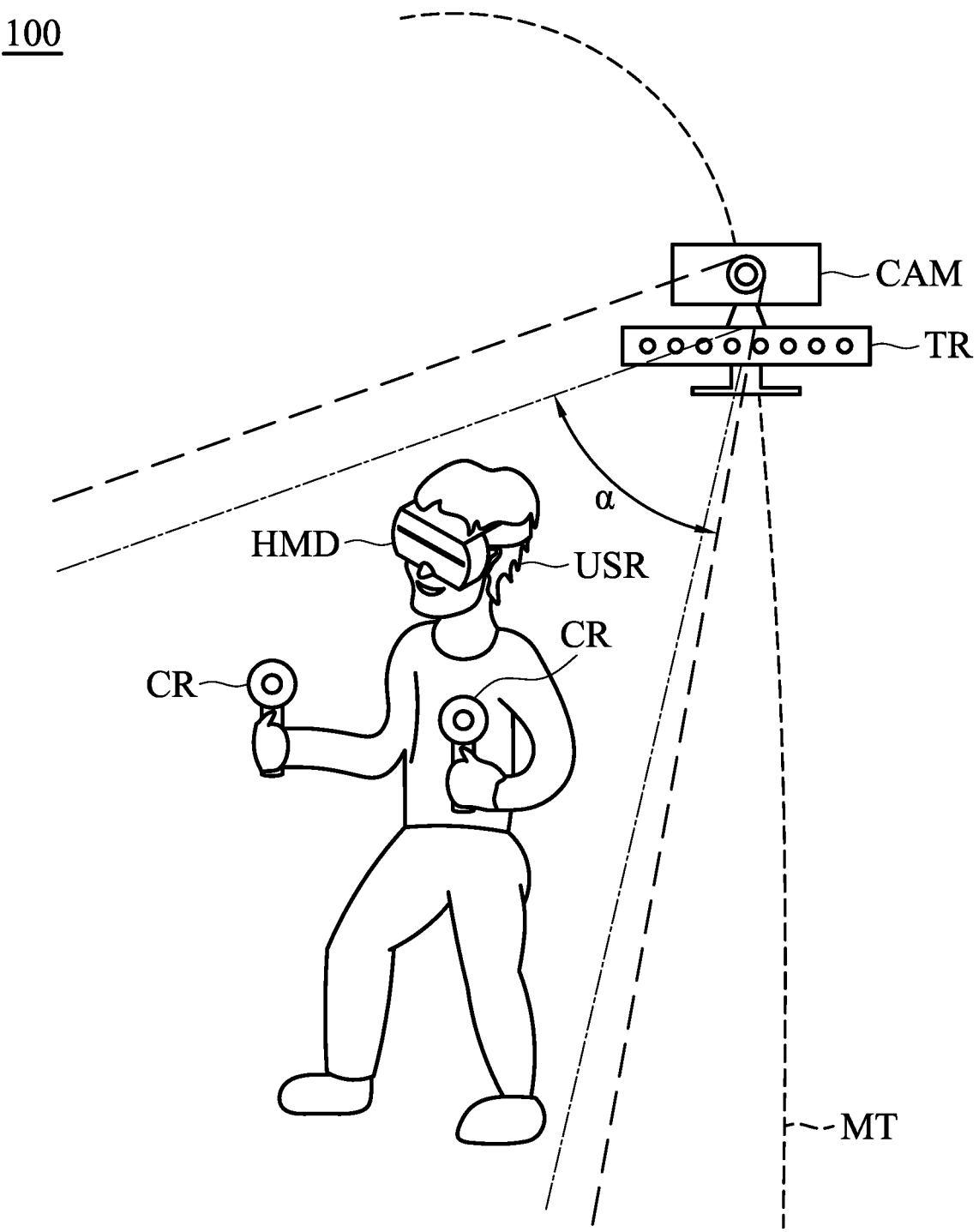
FIG. 1 is a schematic diagram of a mixed reality processing system in accordance with one embodiment of the present disclosure.
Figure 2:
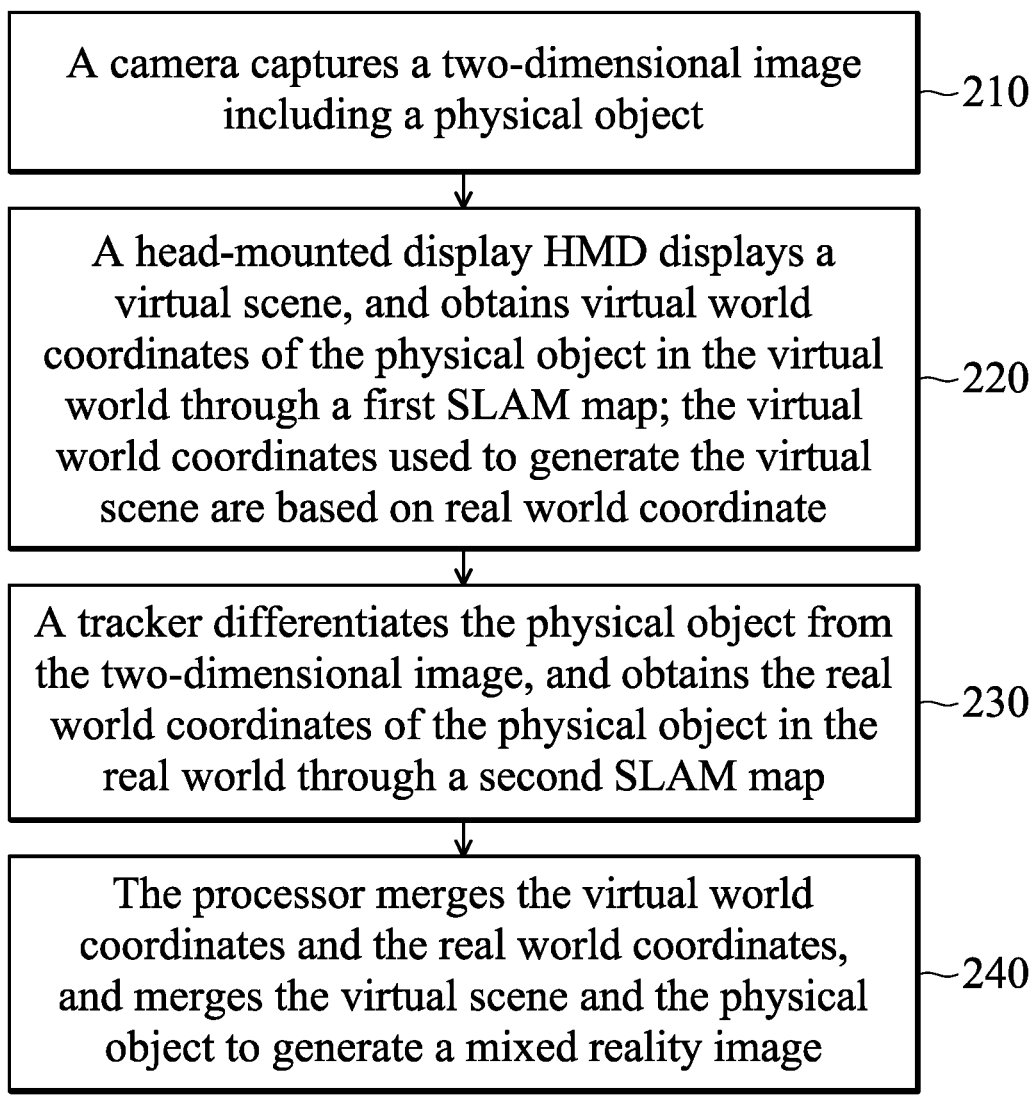
FIG. 2 is a flowchart of mixed reality processing method in accordance with one embodiment of the present disclosure.

Please refer to FIGS. 1-2, FIG. 1 is a schematic diagram of a mixed reality processing system 100 in accordance with one embodiment of the present disclosure. FIG. 2 is a flowchart of mixed reality processing method 200 in accordance with one embodiment of the present disclosure.

In one embodiment, the mixed reality processing system 100 can be applied to a virtual reality system and/or X-Reality.

In one embodiment, the mixed reality processing system 100 includes a camera CAM, a head-mounted display (HMD), a tracker TR, and a processor PR.

Figure 4:
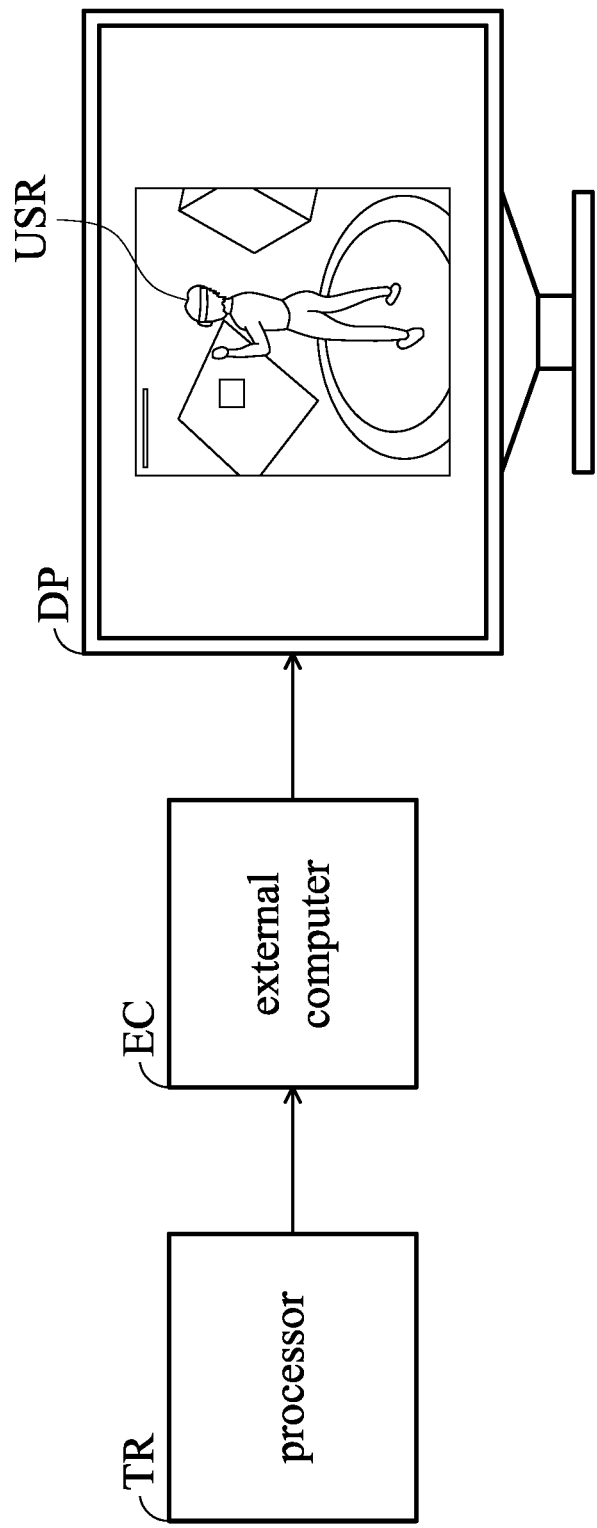
FIG. 4 is a schematic diagram of an application of a mixed reality processing method in accordance with one embodiment of the present disclosure.

In one embodiment, the processor PR can be located in the tracker TR or in an external computer EC (as shown in FIG. 4). In one embodiment, the processor PR is located in the tracker TR, and there is also a processor in the external computer EC. When the computing load of the processor PR is too large, part of the information can be sent to the processor of the external computer EC for processing.

In one embodiment, the processor PR located in the tracker TR is used to perform various operations. The processor PR can be implemented by an integrated circuit such as a micro controller, a microprocessor, a digital signal processor, an application specific integrated circuit (ASIC), or a logic circuit.

In one embodiment, the camera CAM is composed of at least one charge coupled device (CCD) or a complementary metal-oxide semiconductor (CMOS) sensor.

In one embodiment, the tracker TR and the camera CAM are located outside the head-mounted display HMD. The tracker TR and the camera CAM apply outside-in tracking technology to track the head-mounted display HMD s position. The out-to-in tracking technology has high accuracy, and because the amount of transmitted data is small, it has the characteristics of low operation delay, which can reduce part of the error caused by delay.

In one embodiment, the tracker TR is placed adjacent to the camera CAM. For example, as shown in FIG. 1, the camera CAM is placed above the tracker TR, and there will be an included angle α between the shooting range of the camera CAM and the tracking range of the tracker TR. Moreover, the tracker TR and the camera CAM can independently adjust the operating range up, down, left and right, so that even if the user USR moves, the user is still within the included angle α. In one embodiment, the tracker TR and the camera CAM are integrated into one device, or the camera CAM is integrated into the tracker TR.

In an embodiment, the tracker TR and the camera CAM can be placed along a movable trajectory MT to photograph the user USR.

In an embodiment, however, this is only an example, the placement positions of the tracker TR and the camera CAM are not limited thereto, as long as both can capture or track the user USR, and at the intersection of the tracking range and the shooting range, there is an included angle that is less than an angle threshold value (for example, the included angle α).

In one embodiment, the user USR in FIG. 1 holds the controller CR, operates games or applications through the controller CR, and interacts with objects in the virtual reality world or objects in the augmented reality. The present invention is not limited to using the controller CR, as long as it is a device that can operate games or applications, or any method that can control the displaying indicator signals (e.g., using gestures or electronic gloves), it can be applied.

Figure 3:
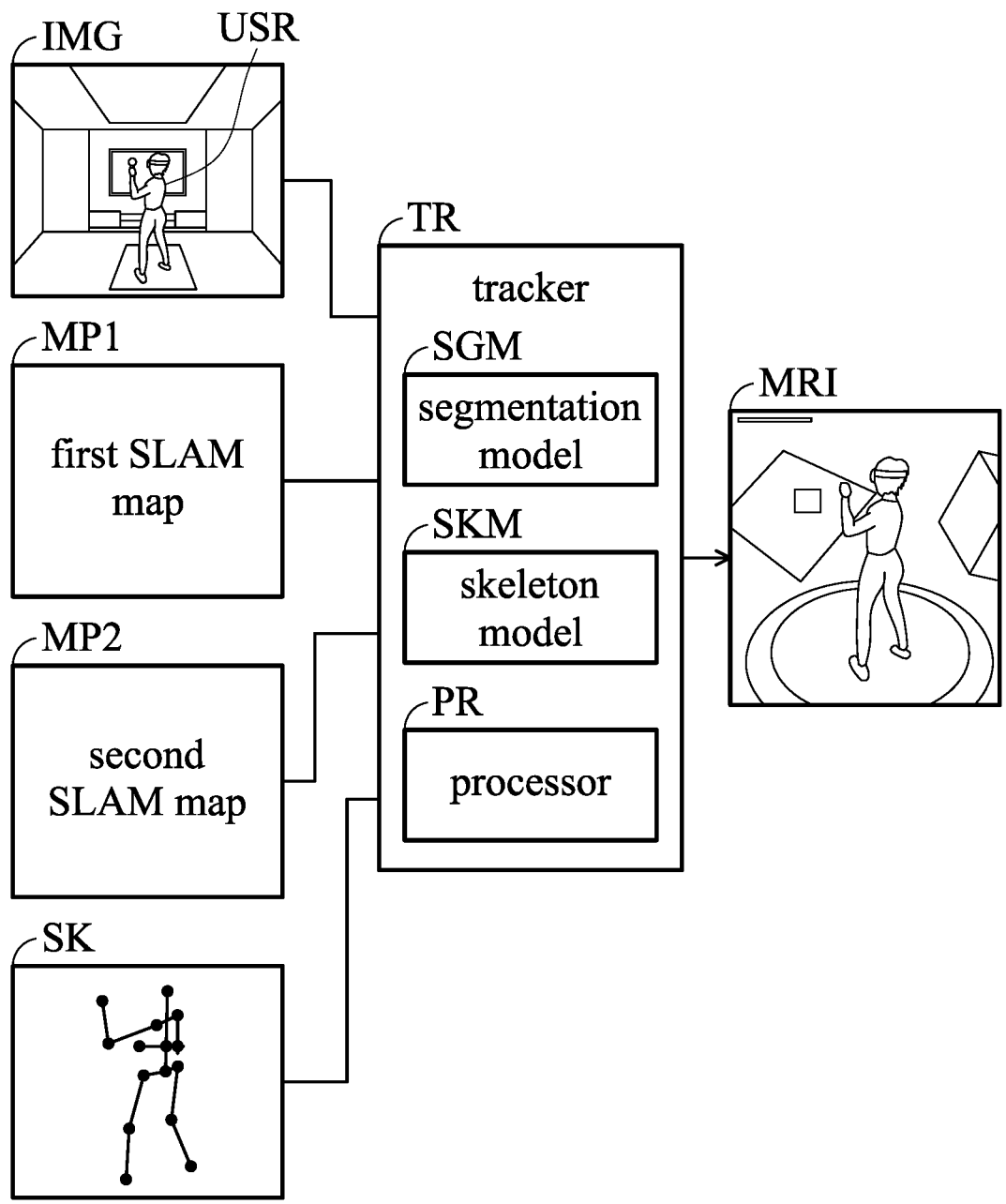
FIG. 3 is a schematic diagram of a mixed reality processing method in accordance with one embodiment of the present disclosure.

In one embodiment, the mixed reality processing method 200 can be implemented by using the elements of the mixed reality processing system 100. Please refer to FIGS. 1 to 3 together. FIG. 3 is a schematic diagram of a mixed reality processing method in accordance with one embodiment of the present disclosure.

In step 210, a camera CAM captures a two-dimensional image IMG including a physical object.

In one embodiment, the tracker TR includes a storage device. In one embodiment, the storage device can be implemented as a read-only memory, a flash memory, a floppy disk, a hard disk, an optical disk, a flash drive, a magnetic tape, a database accessible by network, or a person skilled in the art can easily think of storage media with the same features.

In one embodiment, the storage device is used to store a segmentation model SGM and a skeleton model SKM. The processor PR of the tracker TR can access the segmentation model SGM and/or the skeleton model SKM for execution.

In one embodiment, the segmentation model SGM is a model that has already been trained. In one embodiment, the segmentation model SGM can be implemented through a convolutional neural network (CNN) model, region-based convolutional neural network model (R-CNN) model, or other algorithms that can be applied to perform graph base image segmentation on images. However, those skilled in the art should understand that the present invention is not limited to these models, and other neural network models that can achieve segmentation of human body segments can also be applied.

In one embodiment, the physical object is a human body (such as a user USR). The processor PR of the tracker TR inputs the two-dimensional image into the segmentation model SGM, and the segmentation model SGM outputs a human body block, and the human body block is Part of the 2D image IMG. More specifically, the segmentation model SGM can segment the image of the user USR from the two-dimensional image IMG.

In one embodiment, the skeleton model SKM is a trained model. Skeleton model SKM is used to label important key points of the human body (such as joint points, for example, head, shoulder, elbow, wrist, waist, knee, ankle, etc.), and then generate the skeleton, which is convenient for analyzing the posture and movement of the human body. In one embodiment, if the application of skeleton points is extended to continuous actions, it can be used for behavior analysis, action comparison and other applications. In one embodiment, the skeleton model SKM can be implemented through a convolutional neural network model, a region-based convolutional neural network model, or other algorithms that can be applied to find human skeletons. However, those skilled in the art should understand that the present invention is not limited to these models, as long as other neural network models capable of outputting human skeleton can also be applied.

In one embodiment, the tracker TR inputs the two-dimensional image IMG into a skeleton model SKM (or the tracker TR directly inputs the human body block output by the segmentation model SGM into the skeleton model SKM). The skeleton model SKM outputs multiple human skeleton points. The processor PR of the tracker TR generates a three-dimensional (3D) pose SK according to these human skeleton points. The 3D pose SK is configured to adjust the capture range of the human body block.

In one embodiment, after the segmentation model SGM can segment the image of the user USR from the two-dimensional image IMG, the processor PR inputs the image of the user USR into the skeleton model SKM. The skeleton model SKM outputs multiple human skeleton points. The processor PR generates the three-dimensional pose SK according to the human skeleton points, and adjusts the capture range of the image of the user USR according to the three-dimensional pose SK. In this way, the processor PR can capture a more accurate image of the user USR.

In step 220, a head-mounted display HMD displays a virtual scene, and obtains virtual world coordinates of the physical object in the virtual world through a first simultaneous localization and mapping map (SLAM) map MP1. The virtual world coordinates used to generate the virtual scene are based on real world coordinates.

In one embodiment, the first simultaneous localization and mapping map MP1 obtains perception information in the environment through sensors, incrementally constructs a map of the surrounding environment, and uses the map to achieve autonomous positioning. That is to say, this technology enables the head-mounted display HMD to determine the position by itself, and generate an environment map, thereby determining the entire space. With the first simultaneous localization and mapping map MP1, one can know the spatial coordinates of oneself (head mounted display HMD), and then generate virtual world coordinates according to the real world coordinates. With the virtual world coordinates, a virtual scene can be generated, such as a game scene. Therefore, the head mounted display HMD can calculate the virtual world coordinates of the physical object (e.g., the user USR) located in the virtual world, and transmit the coordinates to the tracker TR.

In step 230, a tracker TR differentiates the physical object from the two-dimensional (2D) image IMG, and obtains the real world coordinates of the physical object in the real world through a second simultaneous localization and mapping map MP2.

In one embodiment, the second simultaneous localization and mapping map MP2 obtains perception information in the environment through a sensor, incrementally constructs a map of the surrounding environment, and uses the map to achieve autonomous positioning. That is to say, this technology enables the tracker TR to determine the position by itself, and generate an environment map, thereby determining the entire space. With the second simultaneous localization and mapping map MP2, it can know the spatial coordinates of itself (tracker TR), and then obtain real-world coordinates.

It can be seen from this that the head-mounted display HMD can obtain the virtual world coordinates and the real world coordinates through the simultaneous localization and mapping map (SLAM) technology, and transmit the virtual world coordinates and the real world coordinates to the tracker TR. On the other hand, the tracker TR can obtain real-world coordinates by itself through SLAM technology. According to the concept of map sharing, the tracker TR respectively merges the origins and coordinate axes (such as X-axis, Y-axis and Z-axis) of the first simultaneous localization and mapping map MP1 and the second simultaneous localization and mapping map MP2, and then the coordinate calibration is completed.

In one embodiment, the coordinate calibration operation can be performed by the processor PR of the tracker TR or by the processor in the external computer EC.

In step 240, the processor PR merges the virtual world coordinates and the real world coordinates, and merges the virtual scene and the physical object to generate a mixed reality image MRI.

Since the virtual world coordinates are generated based on real world coordinates, therefore, each point on the virtual world coordinates can be corresponded to the real world coordinates. The tracker TR only needs to respectively merge the origins and coordinate axes (such as X, Y and Z axes) of the virtual world coordinates and the real world coordinates. After that, the merging coordinates are generated.

In one embodiment, the tracker TR respectively coincides the origins and coordinate axes (such as the X axis, the Y axis and the Z axis) of the virtual world coordinates and the real world coordinates to generate merging coordinates. The processor PR superimposes the human body block from the tracker TR on the virtual scene from the head-mounted display HMD according to the merging coordinates, so as to generate a mixed reality image MRI.

More specifically, the tracker TR can first store the calculated body region (e.g., the image of the user USR) in the storage device. The virtual scene currently displayed by the head mounted display HMD is also transmitted to the tracker TR, and the tracker TR stores the virtual scene in the storage device.

In an embodiment, the processor PR merges the virtual world coordinates and the real world coordinates, and after calculating the merging coordinates, the processor PR can also calculate the position where the image of the user USR is located at the merging coordinates. The processor PR reads the virtual world coordinates from the storage device. scene, or immediately receives the virtual scene currently displayed from the head-mounted display HMD, and then paste the image of the user USR on the virtual scene to generate a mixed reality image MRI.

In one embodiment, in order to superimpose the human body block from tracker TR on the virtual scene from the head-mounted display HMD, it is necessary to obtain the best spatial correspondence between the virtual scene and the user's USR image. The best spatial correspondence includes size, rotation and displacement. This result can be used to calibrate the map data with the merging coordinates, so as to calculate the coordinates of the user's USR image placed in the virtual scene, so as to achieve the purpose of accurate overlay.

FIG. 4 is a schematic diagram of an application of a mixed reality processing method in accordance with one embodiment of the present disclosure.

In one embodiment, the operation to generate the mixed reality image MRI can be performed by the processor PR of the tracker TR or by the processor in the external computer EC.

In one embodiment, the external computer EC may be a laptop, a server, or other electronic devices with computing and storage functions.

In one embodiment, the tracker TR can transmit the mixed-reality image MRI to the external computer EC, and the external computer EC can process subsequent applications, such as uploading the mixed-reality image MRI to YouTube for live game broadcasting. For another example, the mixed reality image MRI is displayed through the display DP to show the latest game for the audience to watch.

To sum up, the embodiments of the present invention provide a mixed reality processing system and a mixed reality processing method, in which a physical object image in a two-dimensional image is differentiated by a tracker. The simultaneous positioning in the tracker and the map construction map and the simultaneous positioning in the head-mounted display and the map construction map are overlapped using the processor. This achieves the effect of coordinate calibration and merges the virtual scene with the physical object image to generate mixed reality imagery. The processor overlaps the simultaneous localization and mapping map in the tracker and the simultaneous localization and mapping map in the head-mounted display. This achieves the effect of coordinate calibration and combines the virtual scene with the real object image to generate a mixed reality image.

Therefore, the mixed reality processing system and the mixed reality processing method of the present invention can obtain an image of a physical object without using a green screen. There is also no need to align the camera with built-in real world coordinates and the handlebar with built-in virtual world coordinates for coordinate calibration.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. A mixed reality processing system, comprising:
   a camera, configured to capture a two-dimensional image including a physical object;
   a head-mounted display (HMD), configured to display a virtual scene, and obtain virtual world coordinates of the physical object in the virtual world through a first simultaneous localization and mapping map (SLAM map); wherein the virtual world coordinates are used to generate the virtual scene based on real world coordinates;
   a tracker, configured to differentiate the physical object from the two-dimensional image, and obtain the real world coordinates of the physical object in the real world merely through a second simultaneous localization and mapping map, wherein the tracker constructs the second simultaneous localization and mapping map by obtaining environment information through a sensor, and uses the second simultaneous localization and mapping map to locate itself and thereby locate the physical object; and
   a processor, configured to merge the virtual world coordinates and the real world coordinates, and merge the virtual scene and the physical object to generate a mixed reality image.

2. The mixed reality processing system of claim 1, wherein the physical object is a human body, the tracker inputs the two-dimensional image into a segmentation model, and the segmentation model outputs a human body block, and the human body block is a part of the two-dimensional image.

3. The mixed reality processing system of claim 2, wherein the tracker inputs the two-dimensional image into a skeleton model, and the skeleton model outputs a plurality of human skeleton points, the tracker generates a three-dimensional pose according to the human skeleton points, and the three-dimensional pose is configured to adjust a capture range of the human body block.

4. The mixed reality processing system of claim 2, wherein the processor is located in the tracker or in an external computer, and the processor is configured to generate merging coordinates after respectively coinciding the origins and coordinate axes of the virtual world coordinates and the real world coordinates;
   wherein the processor superimposes the human body block from the tracker on the virtual scene from the head-mounted display according to the merging coordinates to generate the mixed reality image.

5. The mixed reality processing system of claim 1, wherein the tracker and the camera are located outside the head-mounted display, and outside-in tracking technology is applied to track the position of the head-mounted display.

6. A mixed reality processing method, comprising:
   capturing a two-dimensional image including a physical object using a camera;
   using a head-mounted display (HMD) to display a virtual scene and obtain virtual world coordinates of the physical object in the virtual world through a first simultaneous localization and mapping map (SLAM map), wherein the virtual world coordinates used to generate the virtual scene are based on real world coordinates;
   using a tracker to differentiate the physical object from the two-dimensional image and obtain the real world coordinates of the physical object in the real world merely through a second simultaneous localization and mapping map, wherein the tracker constructs the second simultaneous localization and mapping map by obtaining environment information through a sensor, and uses the second simultaneous localization and mapping map to locate itself and hereby locate the physical object; and
   using a processor to merge the virtual world coordinates and the real world coordinates and merge the virtual scene and the physical object to generate a mixed reality image.

7. The mixed reality processing method of claim 6, wherein the physical object is a human body, the mixed reality processing method further comprising:

the tracker inputs the two-dimensional image into a segmentation model, and the segmentation model outputs a human body block;
wherein the human body block is a part of the two-dimensional image.

8. The mixed reality processing method of claim 7, further comprising:
   using the tracker to input the two-dimensional image into a skeleton model;
   wherein the skeleton model outputs a plurality of human skeleton points, the tracker generates a three-dimensional pose according to the human skeleton points, the three-dimensional pose is configured to adjust the capture range of the human body block.

9. The mixed reality processing method of claim 7, wherein the processor is located in the tracker or in an external computer, and the mixed reality processing method further comprises:
   the processor generates merging coordinates after respectively coinciding the origins and coordinate axes of the virtual world coordinates and the real world coordinates;
   using the processor to generate the mixed reality image by superimposing the human body block from the tracker on the virtual scene from the head-mounted display according to the merging coordinates.

10. The mixed reality processing method of claim 6, wherein the tracker and the camera are located outside the head-mounted display, and outside-in tracking technology is applied to track the position of the head-mounted display.

* * * * *